(12) United States Patent
Cheng et al.

(10) Patent No.: US 6,356,297 B1
(45) Date of Patent: Mar. 12, 2002

(54) METHOD AND APPARATUS FOR DISPLAYING PANORAMAS WITH STREAMING VIDEO

(75) Inventors: Keh-shin Fu Cheng, Mahopac; Keeranoor G. Kumar, Peekskill; James Sargent Lipscomb, Yorktown Heights; Jai Prakash Menon, Peekskill; Marc Hubert Willebeek-LeMair, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/007,729

(22) Filed: Jan. 15, 1998

(51) Int. Cl.⁷ ............................ H04N 7/00; H04N 13/00; H04N 15/00
(52) U.S. Cl. ............................................. 348/36; 348/43
(58) Field of Search ................................ 348/36, 39, 42, 348/47, 48; 345/423, 425, 302, 419; H04N 7/00, 13/00, 15/00

(56) References Cited

U.S. PATENT DOCUMENTS

| | | | | |
|---|---|---|---|---|
| 5,396,583 A | | 3/1995 | Chen et al. ................. | 395/127 |
| 5,495,576 A | * | 2/1996 | Ritchey ....................... | 345/425 |
| 5,714,997 A | * | 2/1998 | Anderson .................... | 348/39 |
| 5,745,126 A | * | 4/1998 | Jain et al. .................... | 348/42 |
| 5,793,895 A | * | 8/1998 | Chang et al. ................ | 382/236 |
| 5,912,670 A | * | 6/1999 | Lipscomb et al. .......... | 345/419 |
| 5,923,334 A | * | 7/1999 | Luken .......................... | 345/423 |

FOREIGN PATENT DOCUMENTS

JP  07093579 A  4/1995

OTHER PUBLICATIONS

"QuickTimeVR—An Image–Based Approach to Virtual Environment Navigation", Chen, Shenchang Eric, ACM SIGGRAPH, pp. 29–38, Aug. 1995.

* cited by examiner

Primary Examiner—Howard Britton
Assistant Examiner—Nhon T Diep
(74) Attorney, Agent, or Firm—Casey P. August; Perman & Green, LLP

(57) ABSTRACT

In this invention streaming video data is embedded within a panoramic image for display. The invention teaches a method and system for displaying an image of a scene of interest from a stored environment map of the scene and from video data of the scene. The method includes the steps of: (A) receiving and storing the video data of the scene; (B) selecting an orientation of the scene; (C) retrieving video data according to the selected orientation of the scene; (D) rendering the environment map according to the selected orientation of the scene to generate a first image for the selected orientation; (E) synchronously combining the retrieved video data and the first image to form a composite image for the selected orientation of the scene of interest; and (F) displaying the composite image. In one embodiment the method for displaying the image of the scene of interest further includes a step of continuously receiving video data packets that include image data and sound data. In this embodiment the sound data is continuously played while selected portions of the image data are displayed. In another embodiment, the method for displaying the image of the scene of interest further includes a step of layering the video data and the first image generated by rendering the environment map. In the present invention layering techniques include, for example, drawing order layering, z-buffer-hiding layering, and chroma-key layering.

18 Claims, 7 Drawing Sheets

METHOD AND APPARATUS FOR DISPLAYING PANORAMAS WITH STREAMING VIDEO

CROSS-REFERENCE TO RELATED APPLICATIONS

This application is related to U.S. patent application Ser. No. 08/697,652, filed Aug. 28, 1996, now U.S. Pat. No. 5,793,895, U.S. patent application Ser. No. 08/720,321, filed Sep. 27, 1996, now U.S. Pat. No. 5,923,334, U.S. patent application Ser. No. 08/723,970, filed Sep. 27, 1996, now U.S. Pat. No. 5,912,670 and copending U.S. patent application Ser. No. 08/745,524, filed Nov. 12, 1996. The disclosure of these U.S. patent applications are incorporated by reference herein in their entireties.

FIELD OF THE INVENTION

This invention relates generally to image processing systems and, more particularly, to image-processing systems that allow a user to create and view panoramic images from data representing multiple views of a scene of interest.

This invention also relates to image-processing systems that display video.

BACKGROUND OF THE INVENTION

Conventional three-dimensional graphics applications and associated hardware render scenes of interest composed of one or more three-dimensional objects. The three-dimensional objects are typically represented by geometric primitives, for example triangles. The three-dimensional graphics applications store graphics data, which represents the position and color of the geometric primitives in a model coordinate system. The graphics applications allow a user to manipulate the graphics data to render the scene, i.e. to display those object(s) of the scene that are visible in a viewing window based upon a viewpoint. The user can navigate through the scene of interest by changing the position and orientation of a viewpoint reference (e.g., by altering a camera viewpoint reference). Also, animations can be performed by navigating through a series of pre-selected positions and orientations of the viewpoint reference.

The rendering operation is a computationally intensive process and, thus, is typically performed by specialized graphics hardware. Such systems are powerful but costly due to the need for specialized hardware dedicated to this purpose.

Moreover, conventional three-dimensional graphics systems require that the user provide a three-dimensional model of the scene (i.e., define the graphics data that represent the position and color of the geometric primitives of the scene in the model coordinate system). Such a three-dimensional model may be created with software in conjunction with peripheral devices (e.g., pen tablets, scanners, cameras, etc.). For example, a three-dimensional graphics software package is sold under the name CATIA by Dassault Systems of France. The CATIA system allows a user to build a three-dimensional model of a scene of interest. However, modeling software like CATIA is expensive, and a significant investment in labor may be required to define the graphics data even for a relatively uncomplicated scene.

Because of the high costs associated with conventional three-dimensional graphics systems, alternative solutions have emerged that provide effective yet limited capabilities in creating and viewing a three-dimensional scene. The alternative solutions are typically suitable for use on standard personal computers without the need for dedicated graphics hardware. One such solution is the software developed and distributed by the International Business Machines Corporation under the name of PANORAMIX.

The PANORAMIX system uses a cylindrical or polyhedral environment map to represent a panoramic view of a scene of interest (or collection of images). Different perspective views are rendered by mapping the cylindrical environment map to a desired viewing window.

Another such panoramic viewer is a software system developed and sold by Apple Computer, Inc. of Cupertino, Calif. under the name of QUICKTIMEVR. The QUICKTIMEVR software is segmented into two packages. The first package, which is sold to content providers, is an authoring tool that allows content providers to develop a panoramic image from multiple views of a scene. The second package is a viewer, which is distributed to consumers and which allows the consumer to view the panoramic images created by the authoring tool. A more detailed description of the operation of the QUICKTIMEVR system may be found in Chen, "QuicktimeVR—An Image-based Approach to Virtual Environment Navigation", ACM SIGGRAPH 1995, Los Angeles, Calif., pp. 29–38, and in U.S. Pat. No. 5,396,583, issued Mar. 7, 1995, entitled "Cylindrical to Planar Image Mapping Using Scanline Coherence", by Chen et al., which is assigned to Apple Computer, Inc.

The QUICKTIMEVR system uses a cylindrical environment map to represent the panoramic view of a scene of interest (or a collection of images). Different perspective views are rendered by mapping the cylindrical environment map to a desired viewing window.

Other commercial panoramic viewing systems include REALSPACE VR, PHOTOBUBBLES, and JUTVISION. These commercial systems, however, do not enable the incorporation of streaming video within the panoramic view of the scene of interest.

The concept of overlaying streaming video onto a panoramic scene is described in commonly assigned, copending U.S. patent application Ser. No. 08/745,524, filed Nov. 12, 1996, entitled "Video Conferencing using Camera Environment Panoramas" by Chandra Narayanaswami. Therein, video data is overlaid onto a panoramic image as a way to reduce the bandwidth for video conferencing. In Narayanaswami, a panoramic environment map is considered static data that is downloaded once and then browsed interactively. Alternatively, video data is considered dynamic, or time-varying, data. Similarly, U.S. patent application Ser. No. 08/723,970, filed Sep. 27, 1996, entitled "Method and Apparatus for overlaying a Bit Map Image on an Environment Map", by Lipscomb et al. discloses how to copy a 2-dimensional bit map of a first image onto a second image made from part of a panoramic environment map.

OBJECTS AND ADVANTAGES OF THE INVENTION

It is a first object and advantage of this invention to provide an image-processing system that allows the display of panoramic images and embedded video images.

It is another object and advantage of this invention to provide an image-processing system that allows synchronizing the display of panoramic images and embedded video images.

It is a further object and advantage of this invention to provide an image-processing system that displays a scene of interest by synchronously combining a panoramic image of the scene and a continuously-received stream of video images.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein streaming video data is embedded within a panoramic image for display.

The present invention teaches a method for displaying an image of a scene of interest from a stored environment map of the scene and from video data of the scene. The method includes the steps of: (A) receiving and storing the video data of the scene; (B) selecting an orientation of the scene; (C) retrieving video data according to the selected orientation of the scene; (D) rendering the environment map according to the selected orientation of the scene to generate a first image for the selected orientation; (E) synchronously combining the retrieved video data and the first image to form a composite image for the selected orientation of the scene of interest; and (F) displaying the composite image.

In one embodiment the method for displaying the image of the scene of interest further includes a step of continuously receiving video data packets that include image data and sound data. In this embodiment the sound data is continuously played while selected portions of the image data are displayed.

In another embodiment, the method for displaying the image of the scene of interest further includes a step of layering the video data and the first image generated by rendering the environment map. In the present invention layering techniques include, for example, drawing order layering, z-buffer-hiding layering, and chroma-key layering.

The present invention further teaches an image processing system for displaying an image of a scene of interest from a stored environment map of said scene and from video data of said scene. The image processing system including an element for receiving and storing the video data of the scene, an element for selecting an orientation of the scene, an element for retrieving video data according to the selected orientation of the scene, an element for rendering the environment map according to the selected orientation of the scene to generate a first image for the selected orientation, an element for synchronously combining the retrieved video data and the first image to form a composite image for the selected orientation of the scene of interest, and an element for displaying the composite image.

BRIEF DESCRIPTION OF THE DRAWINGS

The above set forth and other features of the invention are made more apparent in the ensuing Detailed Description of the Invention when read in conjunction with the attached Drawings, wherein:

FIG. 9 illustrates a method of performing the alternative combined panoramic and video display process in accordance with FIG. 8.

Identically labelled elements appearing in different ones of the above described figures refer to the same elements but may not be referenced in the description for all figures.

DETAILED DESCRIPTION OF THE INVENTION

A method and apparatus for displaying panoramas with streaming video is set forth herein.

Figure 1:
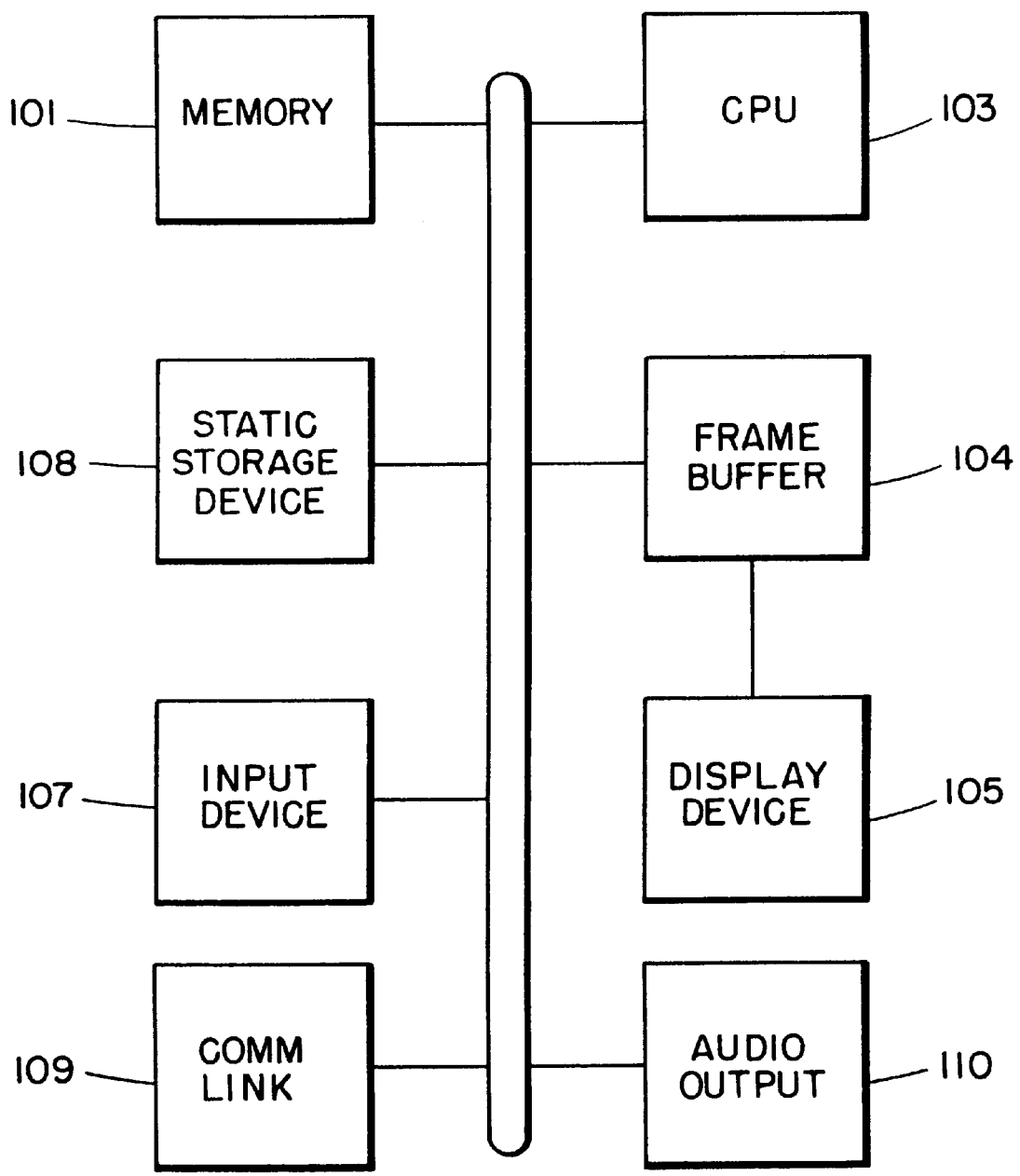
FIG. 1 is a functional block diagram of a computer processing system that may be used by the preferred embodiment of the present invention.

The present invention may be implemented on any computer processing system including, for example, a personal computer, a workstation, or a graphics adapter that works in conjunction with a personal computer or workstation. In FIG. 1, an exemplary computer processing system for use by the present invention is shown. The exemplary computer processing system generally comprises a memory 101, at least one central processing unit (CPU) 103 (one shown), and at least one user input device 107 (such as a keyboard, mouse, joystick, voice recognition system, or handwriting recognition system). Also, the computer processing system includes nonvolatile memory, such as ROM, and/or other nonvolatile storage devices 108, such as a fixed disk drive, that stores an operating system and one or more application programs that are loaded into the memory 101 and executed by the CPU 103. In the execution of the operating system and application program(s) the CPU may use data stored in the nonvolatile storage device 108 and/or memory 101.

The exemplary computer processing system also includes a frame buffer 104 coupled between the CPU 103 and a display device 105. The display device 105 may be a CRT display or a LCD display. The frame buffer 104 contains pixel data, which represents an image to be shown on the display device 105. In some systems a rendering device (not shown), for example a graphics accelerator, may be coupled between the CPU 103 and the frame buffer 104.

Audio display is performed by an Audio Output device 110, which could be for example, speakers or headphones connected directly to the computer system or connected to an audio card that is in turn connected to the computing system.

The exemplary computer processing system may include a communications link 109 (such as a network adapter, RF link, or modem) coupled to the CPU 103 that allows the CPU 103 to communicate with other computer processing systems over the communications link, for example over the Internet. The CPU 103 may receive portions of the operating system, portions of the application program(s), or portions of the data used by the CPU 103 in executing the operating system application program(s) over the communications link.

The application program(s) executed by the CPU 103 may perform the rendering methods of the present invention described in detail below. Alternatively, portions or all of the rendering methods described below may be embodied in hardware that operates in conjunction with the application program executed by the CPU 103.

Figure 2A:
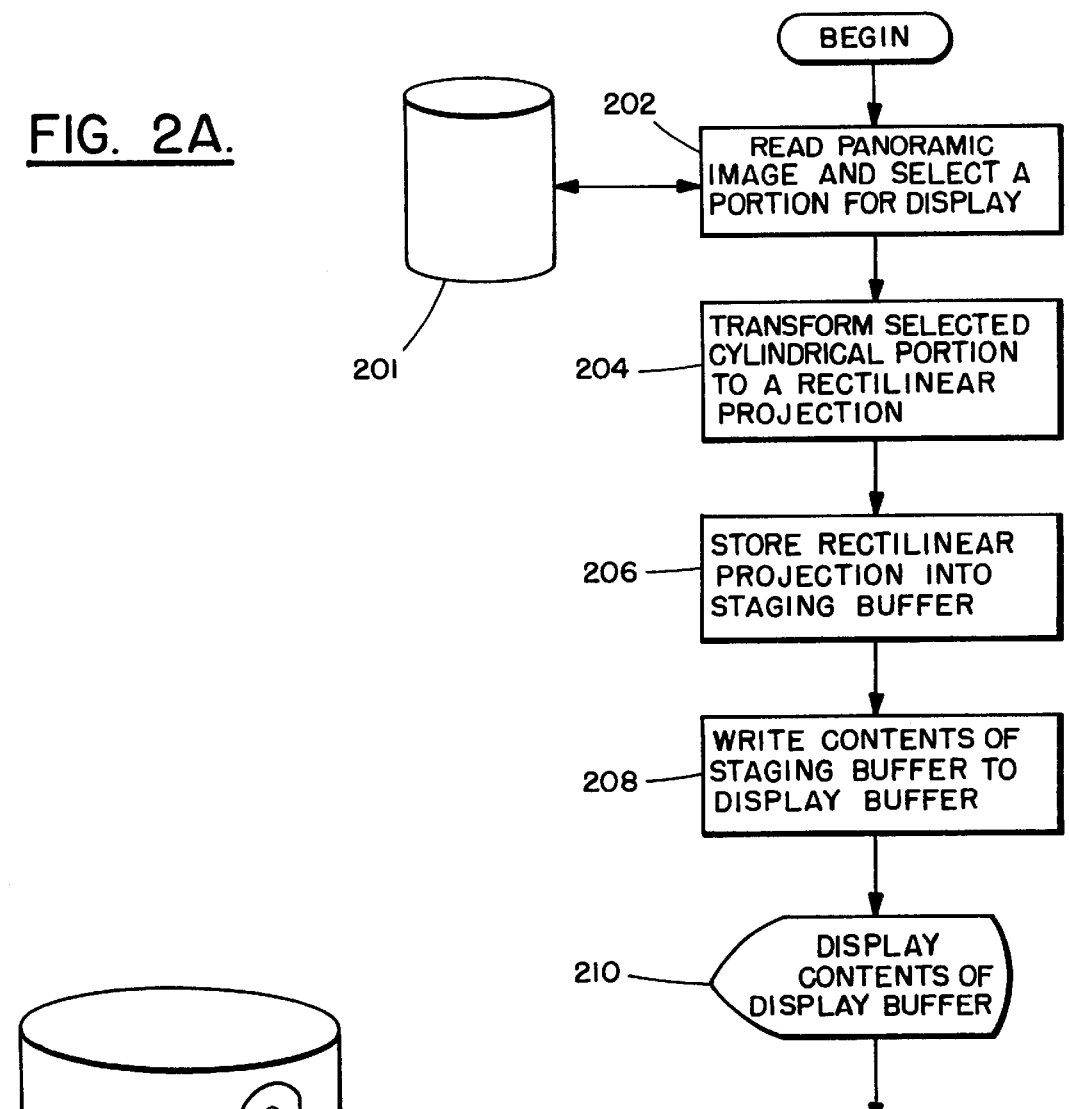
FIG. 2A is a flow chart of the functional blocks of an independent panoramic display process.
Figure 2B:
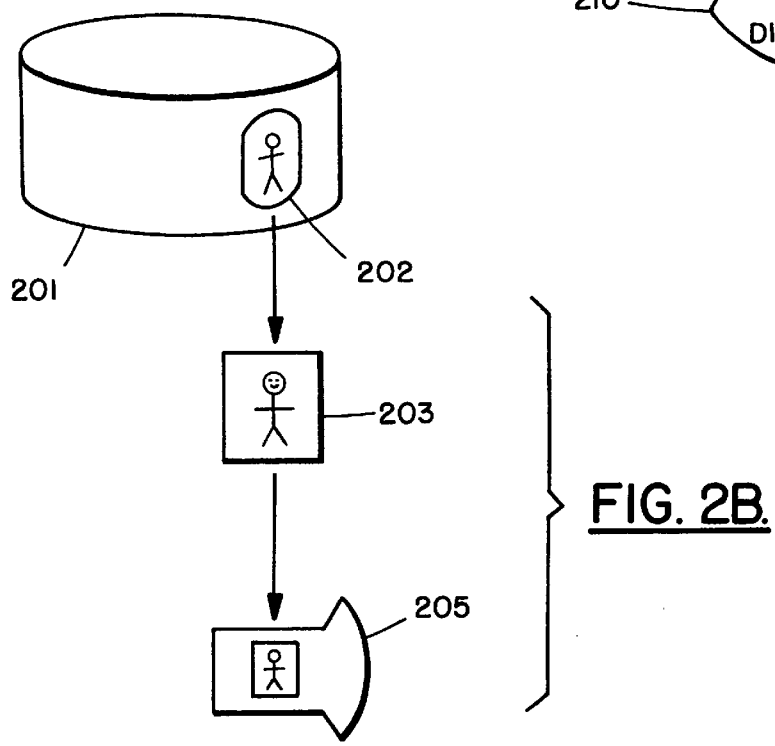
FIG. 2B illustrates a method of performing the panoramic display process in accordance with FIG. 2A.
Figure 3:
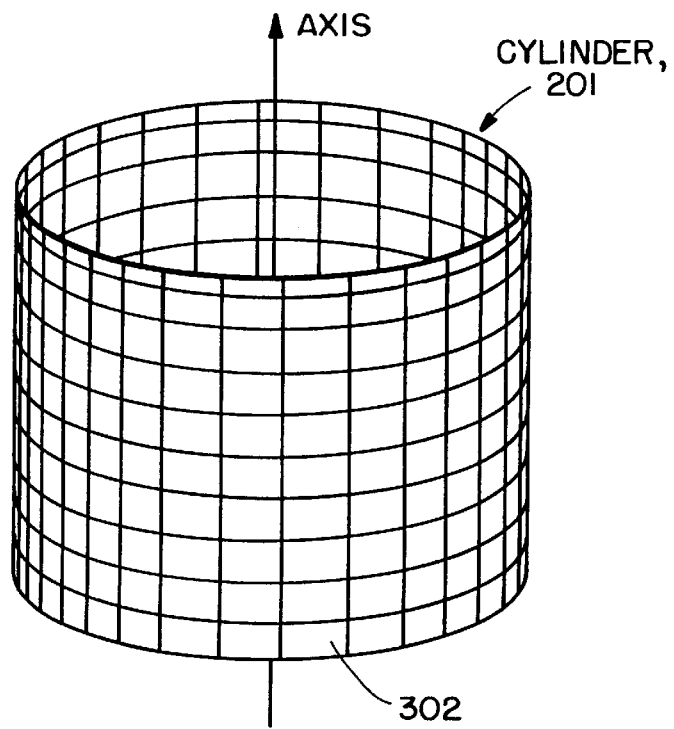
FIG. 3 illustrates a cylindrical environment map divided into rectangular sections and utilized by the independent panoramic display programs for image processing.

As discussed above, the concept of overlaying streaming video onto a panoramic scene is known in the image-processing art, see for example, the above referenced commonly assigned, copending U.S. patent application Ser. Nos. 08/745,524 and 08/723,970. In FIGS. 2A and 2B, an independent panoramic display process is illustrated. Prior to executing this process a background environment map is generated and communication from a source system to a target system. The background environment map is, for example, a cylindrical environment map composed of a rectangular array of elements or pixels, each of which includes data representative of a portion of a three dimensional scene. FIG. 3 illustrates the cylindrical environment map 201, which is divided into many rectangular areas. A given rectangular area 302 is a particular orientation or viewpoint of the scene of interest. Once the cylindrical environment map is received and stored by the target system the panoramic display process may begin.

Referring again to FIGS. 2A and 2B, at Block 202 the independent panoramic display process begins by reading the cylindrical environment map 201, i.e. the panoramic image. By reading the cylindrical environment map 201, a selected portion of the map 202, i.e. a desired orientation or viewing window, is chosen for display. At Block 204, a panoramic staging transformation is performed which transforms the selected cylindrical portion to a rectilinear projection of the scene of interest. The rectilinear projection is stored, at Block 206, in a panoramic staging buffer 203. At Block 208, a display update transformation is performed which results in the contents of the panoramic staging buffer 203 being copied to a display buffer 205. The rectilinear projection, i.e. the contents of the panoramic staging buffer 203, is then ready for display from the display buffer 205, at Block 210, and the panoramic display process is complete.

Figure 4:
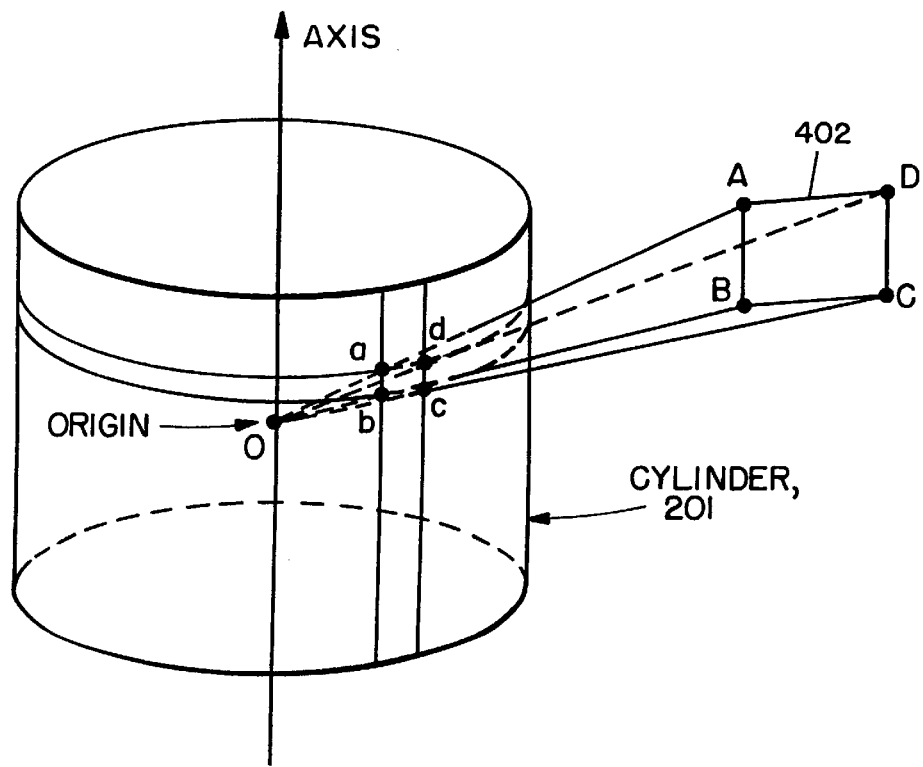
FIG. 4 illustrates a method of calculating a pyramidal volume of a cylindrical rectangular area from the environment map of FIG. 3 utilized by the independent panoramic display programs for image processing.

FIG. 4 illustrates a method for performing the panoramic staging transformation in which the cylindrical projection of the cylindrical environment map 201 is transformed to the rectilinear projection 402. The transformation is accomplished by mapping a narrow pyramid defined by the origin o, and points a, b, c and d, to a rectangular area 402 defined by points A, B, C and D. The mapping process is described in detail within the above referenced commonly assigned, copending U.S. patent application Ser. Nos. 08/745,524 and 08/723,970.

Figure 5:
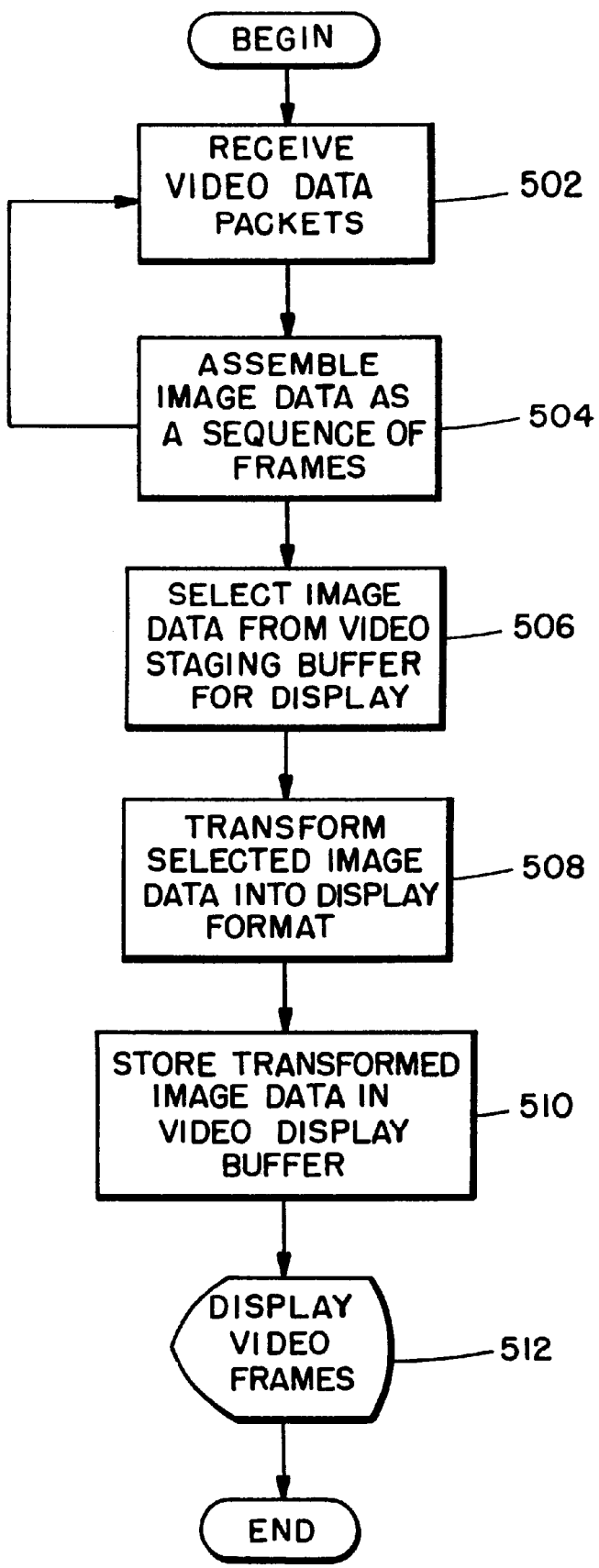
FIG. 5 is a flow chart of the functional blocks of an independent video display process.
Figure 6:
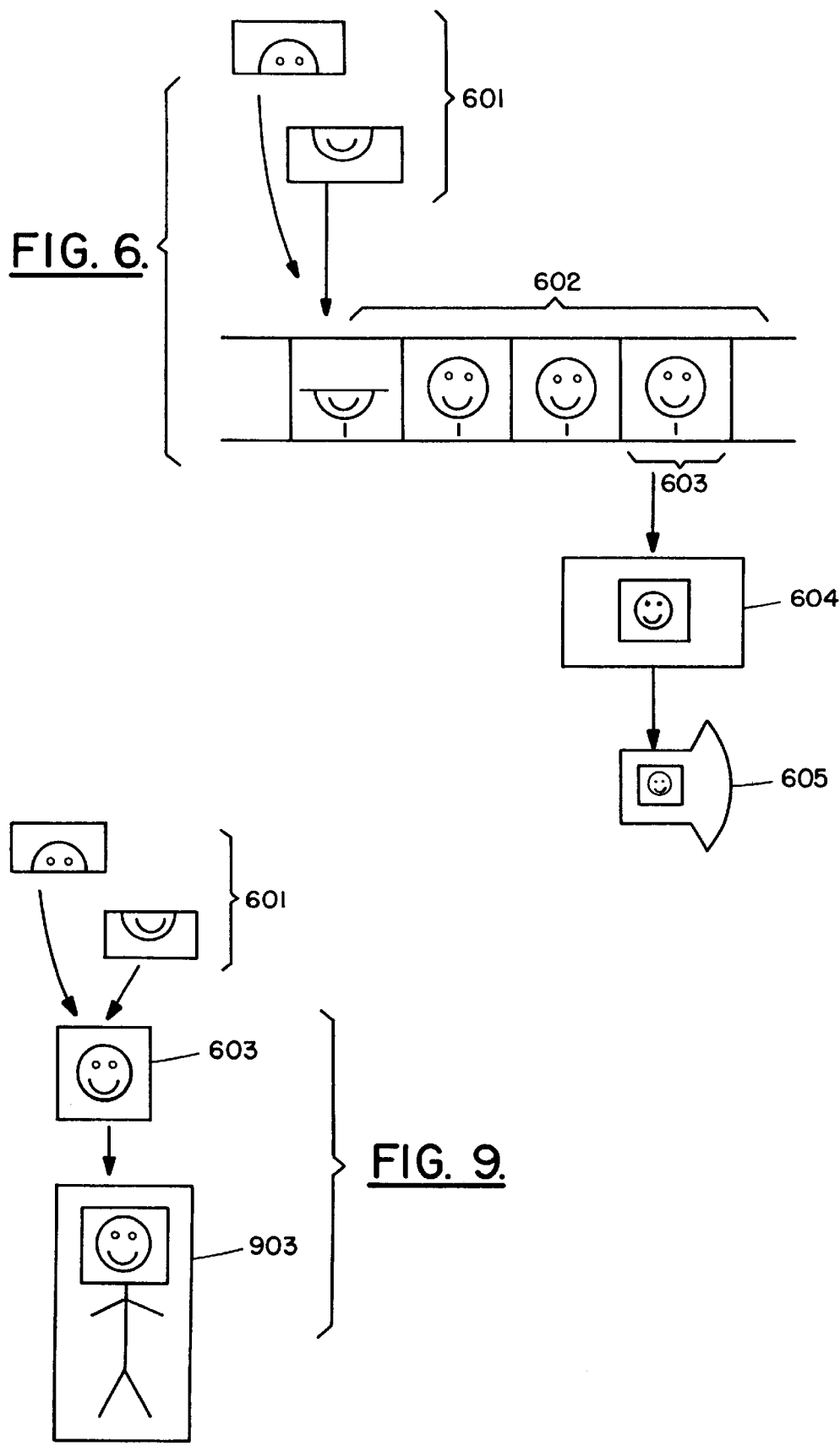
FIG. 6 illustrates a method of performing the video display process in accordance with FIG. 5.

In FIGS. 5 and 6, an independent video display process is illustrated. At Block 502 the video display process begins by receiving video data packets 601 recorded and transmitted from the source system to the target system. The video data packets 601 may include, for example, image data, sound data and instructions recorded at the source system. At Block 504, the received image data is assembled and stored in a video buffer pool 602 as a sequence of frames. The steps of receiving the video data packets 601, and assembling and storing of the image data in the video buffer pool 602 repeat as the source system continuously streams video data packets 601 to the target system. At Block 506, a sequence of image data frames is selected from a video staging buffer 603 of the video buffer pool 602. While the sequence of image data frames is selected for display from the video staging buffer 603, the sound data is played continuously. A display update transformation is then performed at Block 508 which transforms the selected image data frames into a format suitable for display. For example, the display update transformation may convert from 24-bit color to 8-bit color, that is converting 24-bit red-green-blue values to 8-bit pointers to color-map entries having colors close to the desired ones. At Block 510, the transformed image data 604 is stored in a video display buffer 605. The transformed image data 604 is then ready for display from the video display buffer 605, at Block 512, and the video display process is complete.

In accordance with the present invention, the above mentioned independent panoramic display process and the video display process are combined and run simultaneously such that panoramic views of a scene of interest may be rendered with incorporated streaming video. As a result, the streaming video images are displayed embedded in the panoramic image.

It is first noted that the combined process of the present invention improves upon the independent processes in a number of ways. In the above mentioned U.S. patent application Ser. No. 08/745,524, Narayanaswami teaches that video data is overlaid onto a panoramic image as a way to reduce the bandwidth for video conferencing. Narayanaswami further teaches that a panoramic environment map is considered static data and is transmitted to a target system once, while video data is dynamic data and is transmitted to the target system as, or shortly after, it is recorded. The present invention integrates the transmissions of the static and dynamic data in a manner that efficiently utilizes the network bandwidth. First, the network bandwidth is used for downloading the static panoramic image, then the network bandwidth is utilized for transmitting the dynamic video using streaming technology as disclosed in the above mentioned U.S. patent application Ser. No. 08/723,970. The static and dynamic data components are interleaved subsequently for display as a composite image as discussed below.

While the present invention may include similar steps as the independent processes described above, improvements are seen to include the use of streaming video data as a source, the synchronization of the video display and panoramic display processes, and the addition of a compositing transformation step that combines the panoramic and video images for display. The combined process is seen to overcome perceived limitations of the independent process which include a failure to synchronize the video display and the panoramic display, and a failure to provide a transformation of the video prior to display. In the present invention a video data transformation step includes, for example, the ability to scale, clip, shear, stretch, chroma key, and layer the video image into the panoramic image.

Figure 7:
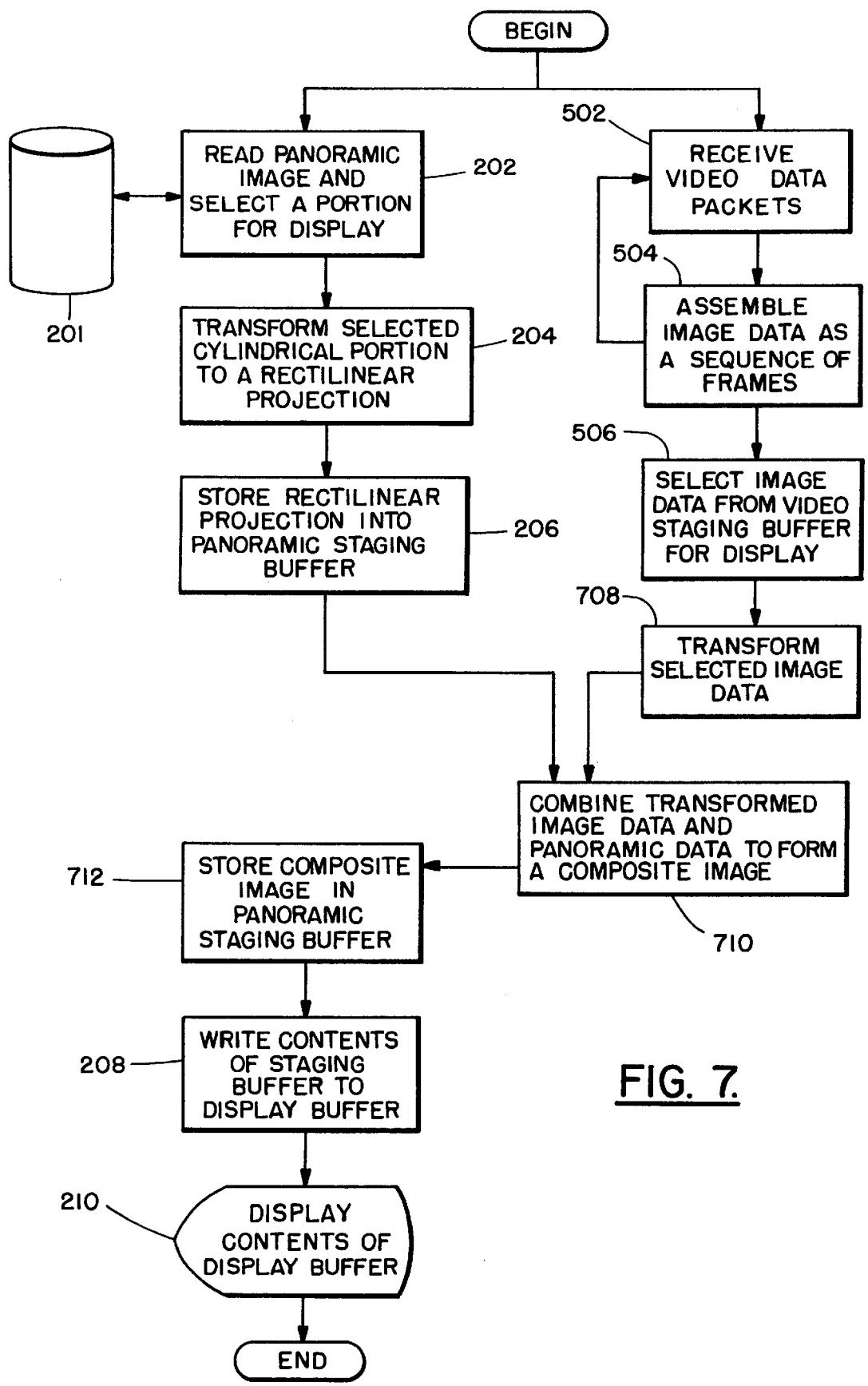
FIG. 7 is a flow chart of the functional blocks of a combined panoramic and video display process in accordance with the present invention.

In FIG. 7 a combined panoramic display and video display process is illustrated. It can be appreciated that in the combined process similarly number steps operate as described in the independent panoramic and video display processes. Thus, in the panoramic display portion of the combined process, Blocks 202 to 206, the stored background environment map is read and a cylindrical portion is transformed, by performing the panoramic transformation function, to a rectilinear projection. Similarly, in the video display portion, Blocks 502 to 506, image data of continuously received video data packets are selected for display. At Block 708 of the combined process, however, a new transformation function, a compositing transformation, transforms the selected video image data from the video staging buffer 603. The transformed video image data is then combined, at Block 710, with the rectilinear projection of the panoramic display process to form a composite image. At Block 712, the composite image is stored in the panoramic staging buffer 203 for display. At Block 208, the independent panoramic display process resumes as the contents of the panoramic staging buffer 203 is copied to the display buffer 205. In this case, the contents of the panoramic staging buffer 203 is the composite image. At Block 210 the composite image is then ready for display from the display buffer 205, and the combined display process is complete.

In one embodiment of the present invention the compositing transformation function includes a step wherein the video display process (Blocks 502 to 506) identifies the selected sequence of image data to be displayed by passing a pointer to the video staging buffer 603 which contains the selected sequence of image data. In this embodiment the pointer is passed, for example, as an argument of a subroutine call. It can be appreciated that the combined panoramic and video display process can call a subroutine of the video display process where an argument in the subroutine call is a location or address of the video staging buffer 603 containing the selected sequence of image data. Alternatively, the video display process can call a subroutine of the combined panoramic and video display process with a parameter holding the address of the video staging buffer 603 which the combined panoramic and video display process then stores for future use. It is noted that one skilled in the art would appreciate that numerous other methods are available (e.g., external events, etc.) to identify the selected sequence of image data to be displayed.

As noted above, in another embodiment of the present invention the compositing transformation function may include a step wherein the selected video image data is scaled, clipped, sheared, stretched, chroma keyed, and layered before it is incorporated into the panoramic image. This embodiment may also include a step of volume control for sound data received when the video image data was received from the source system. As discussed above, while image data is selected, the sound data is continuously played.

From the discussion above, it can be appreciated that elements which distinguish the combined process from the independent processes include, at least, the ability to synchronize the panoramic drawing process and the video drawing process, and the compositing transformation step. These elements are discussed in detail below.

In the present invention a synchronization strategy includes the coordination of the steps of:
1. Performing the panoramic staging transformation, Block 204;
2. Performing the compositing transformation which includes combining of the transformed image data with the panoramic data, Blocks 708 and 710; and
3. Performing the display update transformation, Block 208, which writes the contents of the panoramic staging buffer 203 to the display buffer 205 for display.

It is noted that synchronization of these steps is of particular importance if a system operating in accordance with the invention does not clear the staging buffers between successive images. For example, if an uncleared buffer is read asynchronously as it is being written, then the resulting read would partly include a previously written image mixed with the image currently being written.

Referring again to FIG. 7, the first step of the synchronization strategy is described. The panoramic staging transformation (Block 204) and the display update transformation (Block 208) can be seen to function as two processes running asynchronously. In this asynchronized operating mode, the time for display is optimized but image tearing is possible as the panoramic staging buffer 203 may hold a partly-updated image when the display update transformation occurs. The two asynchronously running processes would include the steps of:

In the Panoramic Staging Transformation Step:
1. Performing the panoramic staging transformation at Block 204;
2. Waiting for viewpoint motion;
3. Updating the view direction and zoom; and
4. Going to step 1.

In the Display Update Transformation Step:
1. Waiting for the vertical blanking interval on the display device;
2. Performing the display update transformation at Block 208; and
3. Going to step 1.

However, if the programs were synchronized the display would be delayed, but image tearing would be avoided as the panoramic staging buffer would contain a single, fully formed image when the display update transformation copies it. The synchronized process in which the panoramic staging transformation (panorama only, no video) alternates with the display update transformation would include the following steps:

Synchronized Process:
1. Performing the panoramic staging transformation at Block 204;
2. Waiting for the vertical blanking interval on the display device;
3. Performing the display update transformation at Block 208;
4. Waiting for viewpoint motion;
5. Updating the view direction and zoom; and
6. Going to step 1.

The second step of the synchronization strategy is now described. In the second step the relationship between the compositing transformation (Blocks 708 and 710), the panoramic staging transformation (Block 204), and the display update transformation (Block 208) is analyzed. It is noted that since video image data is being overlayed into the panoramic staging buffer, a synchronized process is preferred. The synchronized process avoids the display of the transformed panorama without the video image data, or alternatively, the display of the transformed panorama with a partial video image. Thus, the synchronization of the panoramic staging transformation (Block 204), the compositing transformation (Blocks 708 and 710), and the display update transformation (Block 208) can be seen to function as two processes running synchronously as:

In the Video Display Process:
1. Receiving the video data packets 601 into the video buffer pool 602 and assembling the image data frames until enough packets arrive to form a new complete image at Blocks 502 and 504;
2. Repeating step 1 until a "new video staging buffer" flag is cleared;
3. Waiting for a "compositing transformation" flag to be cleared;
4. Moving a pointer to the video staging buffer 603 which contains the selected sequence of image data to be displayed to point to the latest image;
5. Setting the "new video staging buffer" flag;
6. Removing the previous video staging buffer images and returning storage to the video buffer pool 602; and
7. Going to step 1.

In the Panoramic Display Process:
1. Performing the panoramic staging transformation at Block 204;
2. Setting the "compositing transformation" flag;
3. Performing the compositing transformation at Blocks 708 and 710;
4. Clearing the "compositing transformation" flag;
5. Clearing the "new video staging buffer" flag;
6. Waiting for the vertical blanking interval on the display device;
7. Performing the display update transformation at Block 208;
8. Waiting for a change in view direction, "in zoom", or for the "new video staging buffer" flag to be set; and
9. Going to step 1.

In another embodiment, the synchronization of the panoramic staging transformation (Block 204), the compositing transformation (Blocks 708 and 710), and the display update transformation (Block 208) function as:

In the Video Display Process, with a "new video staging buffer" flag initially clear:
1. Receiving the video data packets 601 into the video buffer pool 602 and assembling the image data frames until enough packets arrive to form a new complete image at Blocks 502 and 504;
2. Repeating step 1 until a "compositing transformation" flag is set;
3. Moving the video staging buffer 603 pointer to point to the latest image;
4. Setting a "new video staging buffer" flag;
5. Waiting for the "compositing transformation" flag to be cleared;
6. Removing the previous video staging buffer images and returning storage to the video buffer pool 602; and
7. Going to step 1.

In the Panoramic Display Process, with a "compositing transformation" flag initially clear:
1. Performing the panoramic staging transformation at Block 204;
2. Setting compositing transformation flag;
3. Waiting. Going ahead when the "new video staging buffer" flag is set, or going ahead if step 9 was a change from the previous view direction or zoom of the previously displayed image, or going ahead when the view direction or zoom changes;
4. Performing the compositing transformation at Blocks 708 and 710;
5. Clearing the "new video staging buffer" flag;
6. Clearing the "compositing transformation" flag;
7. Waiting for the vertical blanking interval on the display device;
8. Performing the display update transformation at Block 208;
9. Updating the view direction and zoom; and
10. Going to step 1.

It can be appreciated that alternate methods of setting and clearing "flags" as well as other techniques for conditional execution of process steps on the occurrence of a predetermined event are within the scope of the present invention. An important feature of the present invention includes the synchronization of the panoramic staging transformation step (Block 204), the compositing transformation step (Blocks 708 and 710), and the display update transformation step (Block 208), and thus, the implementation of the synchronization is not an important element of the invention.

Additionally, it is noted that any sequential operating order is possible and may include, for example, executing several panoramic staging steps and compositing transformations steps for multiple panoramas and video streams provided that the display update transformation step (Block 208) is performed as a last step.

Figure 8:
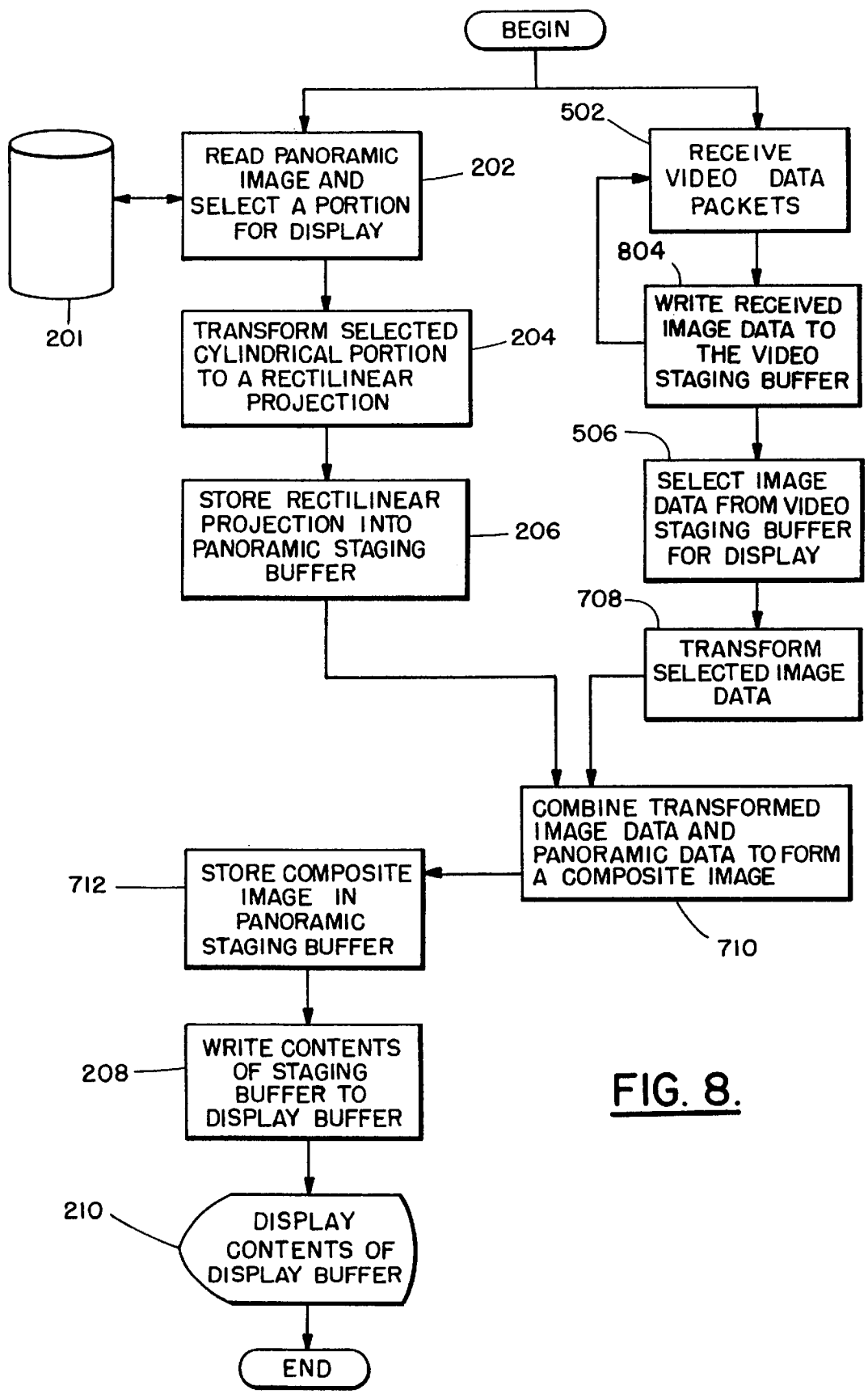
FIG. 8 is a flow chart of the functional blocks of an alternative combined panoramic and video display process in accordance with the present invention.

In an alternate embodiment of the present invention, shown in FIGS. 8 and 9, a video staging transformation (Block 804) is incorporated into the independent video display process illustrated in FIGS. 6 and 7. As in FIGS. 6 and 7, the alternate video display process receives, at Block 502, video data packets 601 from the source system. At Block 804, however, the video staging transformation writes the image data of the received video data packets 601 directly into the video staging buffer 603. As in the independent video display process, the steps of receiving video data packets 601 and storing the received image data in the video staging buffer 603 repeat as the source system continuously streams video data packets 601 to the target system.

The remaining steps of the alternate video display process are performed as described above in the discussion of the combined panoramic display and video display process, FIG. 7. Thus, received image data is selected from the video staging buffer 603 (Block 506), transformed by the compositing transformation (Block 708), combined with the panoramic data to form the composite image 903 (Block 710), and staged for display (Blocks 712 to 210).

It is noted that the video staging transformation (Block 804) may be either asynchronized or synchronized with the compositing transformation (Blocks 708 and 710). As noted above, an asynchronized implementation may speed display time, but also can cause image tearing as the video staging buffer holds a partly-updated image when the compositing transformation occurs. In operation, this asynchronous operating process may be preformed as follows:

In the Video Display Process, with a "new video staging buffer" flag initially clear:
1. Reading the video data packets (601) into the video staging buffer (603) until enough packets arrive to form a new complete image (Blocks 502 and 804); and
2. Going to step 1.

In the Panoramic Display Process, with a "compositing transformation" flag initially clear:
1. Performing the panoramic staging transformation at Block 204;
2. Performing the compositing transformation at Blocks 708 and 710;
3. Waiting for the vertical blanking interval on the display device;
4. Performing the display update transformation at Block 208;
5. Updating the view direction and zoom; and
6. Going to step 1.

When the video staging transformation (Block 804) is synchronized with the compositing transformation (Blocks 708 and 710), the display is delayed, but image tearing is avoided. In a synchronized operating mode the video staging transformation alternates with the compositing transformation, and thus, the panoramic display process runs simultaneously with the video display process as follows:

In the Video Display Process, with a "new video staging buffer" flag initially clear:

1. Reading the video data packets 601 into the video staging buffer 603 until enough packets arrive to form a new complete image at Blocks 502 and 804;
2. Repeating step 1 until a "compositing transformation" flag is set;
3. Setting the "new video staging buffer" flag;
4. Waiting for the "compositing transformation" flag to be cleared; and
5. Going to step 1.

In the Panoramic Display Process, with the "compositing transformation" flag initially clear:

1. Performing the panoramic staging transformation at Block 204;
2. Setting the "compositing transformation" flag;
3. Waiting for the "new video staging buffer" flag to be set;
4. Performing the compositing transformation at Block 708 and 710;
5. Clearing the "new video staging buffer" flag;
6. Clearing the "compositing transformation" flag;
7. Waiting for the vertical blanking interval on the display device;
8. Performing the display update transformation at Block 208;
9. Updating the view direction and zoom; and
10. Going to step 1.

Referring again to FIG. 7, the third step of the synchronization strategy is now described. In the third step the relationship between the display update transformation (Block 208) and the display device refresh period is analyzed. As above, the display update transformation and the display device refresh period may operate in a synchronized or an asynchronized mode. It is noted, however, that typically the display device refresh period is provided by the operating system of the computer executing in accordance with the present invention, and thus, the time frame in which the refresh period begins is not controlled by an application executing on the computer. As such, the methods of the present invention can control when the display update transformation occurs with respect to the other transformations (e.g., the compositing and the panoramic staging transformations) under application control but can not control the display device's refresh period.

Therefore, in a synchronized operating mode each of the process steps outlined in the previous discussions would include the step of "Waiting for the vertical blanking interval on display device", while in an asynchronous operating mode this step would not be present.

It is particularly noted that within the above discussions of each of the three steps of the synchronization strategy that each staging buffer was not cleared before an image was written to it. If these processes were revised such that the staging buffer was cleared prior to any of the transformations writing to it, then that transformation must be synchronized with any transformations that read that buffer so that the reading transformation does not read a cleared or partly-cleared buffer, which would display a missing or incomplete image.

Having discussed options for the synchronization strategy of the present invention, the following discussion focusses upon the video data transformation step which includes, for example, the ability to scale, clip, shear, stretch, chroma key, and layer the video image into the panoramic image.

It is first noted that the process of scaling and shearing image data is known in the image processing art and may be found, for example, in "Computer Graphics, principles and practice" by J. D. Foley, A. van Dam, S. K. Feiner, and J. F. Hughes, second edition, 1990, Addison-Wesley Publishing Company, Reading, N.Y. at chapter 5, Geometrical Transformations. It is also noted that the independent panoramic display process of FIG. 2A may employ scaling operations as a "zoom" function is executed.

As discussed above, the compositing transformation includes, for example, the ability to scale or shear the video image data as the image data is transformed and combined with the panoramic data in the panoramic staging buffer 603 (Blocks 708 to 712 of FIG. 7). According to one embodiment of the present invention, the compositing transformation (Block 708) scales the video image data so as to maintain consistency with any scaling operations performed in the panoramic staging transformation (Block 204). By maintaining consistent scaling operations, the video data image is proportional to the scaled image from the panoramic staging transformation. As a result, both the video data image and the panoramic image zoom equally. Also, the position of one point in the video image data is maintained in the panoramic staging buffer 203 during the zoom operation so that the one point appears fixed at a corresponding location on the panoramic image.

Similarly, shearing operations within the compositing transformation of the one embodiment of the invention are performed to maintain consistency with shearing operations in the panoramic staging transformation. Thus, shearing operations are accomplished by mapping the pixels in the video image data to the panoramic staging buffer 203 so that they too appear to be fixed in place on the panoramic image.

In accordance with the present invention, video image data may be layered with the panoramic image data as the images are combined to form the composite image (Blocks 708 and 710). It is noted that the layering operations of the compositing transformation may embed the video image data, in whole or in part, onto the panoramic image data, or vice-versa. In accordance with the present invention, layering techniques may include, for example, drawing order, z-buffer hiding, and chroma-keying techniques.

In the drawing order layering technique a second image is painted onto a first, original image so that in a resulting composite image the second image may appear closer to an observer for the second images occludes the first image. The z-buffer hiding layering technique also paints a second image onto a first, original image to make it appear that the second image is closer to the observer, but in the z-buffer hiding layering technique pixels are individually drawn, or not drawn, based upon depth information corresponding to each pixel. Only the pixels with corresponding depth information which indicates that the pixel is closer to the observer is drawn. Thus, the z-buffer hiding layering technique allows an object (the second image) to partly protrude in front of another object (the first image).

It is noted that both the drawing order and z-buffer hiding layering techniques are known in the image processing art and detailed descriptions of each technique may be found, for example, in "Computer Graphics, principles and practice" by J. D. Foley, A. van Dam, S. K. Feiner, and J. F. Hughes, second edition, 1990, Addison-Wesley Publishing Company, Reading N.Y., see index under painter's algorithm and z-Buffer.

Similarly, the chroma-keying layering technique also paints a second image onto a first, original image to make it appear that the second image is closer to or farther from the observer. However, in the chroma-keying layering technique pixels are individually drawn, or not drawn, based on a value representing the color of the pixel. The chroma-keying layering technique is discussed in detail below.

In one embodiment of the present invention each of the above mentioned layering technique may, or may not, be performed as the video data image is transformed and combined with the panoramic data image. While these independent layering techniques have been applied as sprites (2-dimensional images) overlaid onto a panoramic image, the layering techniques have heretofor not been applied as video image data combined with panoramic image data to form a composite image suitable for display. It is noted that the transformation operation may employ the layering techniques in any order, if at all, and that one or more panoramic staging transformations and one or more compositing transformations may be performed as the video image data and panoramic image data are combined.

In the following discussion the chroma-keying layering technique is further analyzed. It is first noted, however, that in the present invention chroma-keying layering may apply to the image being written to a particular destination, i.e. the image transmitted by the source, or the image at the destination, i.e. the image in the write buffer of the target.

The chroma key technique is a common layering technique used in, for example, the television (TV) and the movie industries to write parts of an image instead of copying the entire image based on image content. By example, the chroma-keying technique allows a TV weather person standing in front of a blue or green screen to appear to stand in front of a large weather map. The method is based on a process in which a decision to write, or not to write, pixels depending on a chroma key threshold. The chroma key threshold is a combination of color, lightness, and value of the pixels in the image to be written, or in the image being written onto. A more detailed description of the chroma-keying layering technique may be found in, for example, "Video Demystified, a Handbook for the Digital Engineer" by Keith Jack, second edition, 1996, HighText Publications, San Diego, 404–412 and A-54.

In an exemplary chroma key, a chroma-key-color value is red with no green or blue. A red-green-blue (RGB) pixel value is not written if it has the specified red value with no green or blue. In this way the chroma-key value is the same as being transparent. This is done in the video-conferencing example below. In another exemplary chroma key, a chroma-key-color value is red with no green or blue. A RGB pixel value is written if the background being written onto has the specified red value with no green or blue. In this way the chroma-key value is the same as being a screen on which to project an image. This is done in the flight-simulation example below.

In a second example, a video conference is analyzed. In this example, a composite image includes a person's head displayed on a panoramic scene of a conference room. The panoramic staging transformation (Block 204 of FIG. 7) transforms a selected cylindrical portion of the panoramic image 201 to a rectilinear projection and stores the rectilinear projection in the panoramic display staging buffer 203 (Block 206). A video image of the person is then recorded by the source system against a distinctive, flat background and transmitted to the target system. The flat background color is declared to be a chroma key, which enables a transformation of the pixels representing the person and not the distinctive, flat background. Therefore, the distinctive, flat background does not appear in the composite image. Thus, the chroma-keyed compositing transformation. (Blocks 708 and 710) copies to the panoramic display staging buffer 203 (which now only has the panoramic image data) the video image data from the video staging buffer 603 that lie outside the chroma key range, i.e. the pixels representing the person and not the distinctive, flat background to form the composite image. The composite image is stored in the panoramic staging buffer 203 (Block 712). Once the update display transformation is performed (Block 208) the composite image is ready for display (Block 210). Thus, a pertinent subset of the combined panoramic and video display process employing chroma-keyed transformations is performed as follows:

1. Advancing to the next pixel in the panoramic staging buffer;
2. Performing the panoramic staging transformation at Block 204 for that pixel;
3. Selecting the corresponding pixel in the video staging buffer 603 to be copied to the panoramic staging buffer 203 at Block 506;
4. If the red, green, or blue components of the video pixel are all within the specified ranges of red, green, and blue color to be chroma keyed, then going to step 1;
5. Transforming the video staging buffer 603 pixel and combining the pixel with the panoramic image in the panoramic staging buffer 203; and
6. Going to step 1.

In a further example, a flight simulation sequence is analyzed. In the flight simulation, a composite image includes a video image displayed outside a window in a cockpit interior panoramic image. In this example, as above, the panoramic staging transformation (Block 204) transforms a selected cylindrical portion of the panoramic image 201 of the cockpit to a rectilinear projection and stores the rectilinear projection in the panoramic display staging buffer 203 (Block 206). The panoramic image has a distinctive, flat background color in the windows area of the cockpit. A video of a takeoff and landing is recorded by the source system and stored in the video staging buffer 603 of the target system. The chroma-keyed compositing transformation (Blocks 708 and 710) transforms the video image in the video staging buffer that fall on those parts of the cockpit scene that are within the chroma-key threshold range. The panoramic display staging buffer 203 (which now has the panoramic background of the cockpit) is combined with the transformed video image to form the composite image. In this example, the video image is layered and cropped left-right and up-down to appear to be beyond the cockpit window. The pertinent subset of the combined panoramic and video display process employing chroma-keyed transformations for the flight simulation example is performed as follows:

1. Advancing to the next pixel in the panoramic staging buffer 203;
2. Performing the panoramic staging transformation for that pixel at Block 204;
3. If a red, green, or blue component of the panoramic pixel is outside the specified ranges of red, green, and blue color to be chroma keyed, then going to step 1;
4. Selecting the corresponding pixel in the video staging buffer 603 to be copied to the panoramic staging buffer 203;
5. Transforming the video staging buffer 603 pixel and combining it with the contents of the panoramic staging buffer 203; and
6. Going to step 1.

Alternatively, the entire video image may be copied first, and then the chroma-keyed panoramic image may be copied for those panorama pixel values outside of the chroma key. In this way the pixels representing the cockpit interior would overwrite some of the pixels representing the video takeoff and landings. In other words, the pixels that represent the windows of the cockpit are not written and therefore leave that portion of the video image visible.

It is noted that in one embodiment the chroma key values are each represented as a range of values. The use of ranges of chroma key values is of particular importance when the video data packets are transmitted from the source system to the target system in a compressed transmission format. Typically, in compressed transmissions the encoding and decoding of the compressed data often results in a variation of values. In the flight simulation example, employing chroma key ranges enables the process to anticipate a possibility of an inaccurate value due to a decompression operation which failed to preserve a precise red-green-blue pixel color value.

It is also important to use ranges of chroma key values when still images are transmitted, or if a compression scheme is used, for example JPEG compression, which inherently introduces variations between values before and after compression.

In another embodiment a separate chroma-key panoramic image can be kept. This can be one bit in the original panoramic image, or it can be a separate image with a precise chroma-key value. The separate chroma-key image, hereinafter referred to as a mask, can permit or prohibit writing of the color image. The mask may, for example, have one of two color values at each of its pixels. A first chroma-key value means that the mask is transparent and that the video image will show through. A second chroma-key value is some other color that means the mask is opaque and thus blocks the view of the video image.

In the flight-simulation example, the video pixels are drawn or not drawn depending on the state of pixels in the panorama, which are static. In the video-conferencing example, the video pixels are drawn or not drawn depending on the value of pixels in the video, which is moving, and so the mask would have to also be a moving video image.

If a mask is maintained it can have the same dimensions as the panorama. If the flight-simulation example utilized such a mask it would be performed as follows:

1. Advancing to the next pixel in the panoramic staging buffer 203;
2. Performing the panoramic staging transformation for that pixel at Block 204, this step requires finding the proper pixel in the panoramic image, say pixel (i,j), and copying it to the panoramic staging buffer 203;
3. Finding the corresponding pixel in the mask, in this embodiment the mask has the same dimensions as the panoramic image, so mask pixel (i,j) is found;
4. If the mask pixel (i,j) does not have the chroma-key value:
   a. then the mask is opaque and the video is not drawn, go to step 1;
   b. else the mask is transparent, as in a transparent cockpit window, so draw the video on the panorama as defined in the steps below;
5. Calculating the corresponding pixel in the video staging buffer 603 to be copied to the panoramic staging buffer 203;
6. Copying the video staging buffer 603 pixel to the panoramic staging buffer 203; and
7. Going to step 1.

If the mask is maintained it need not have the same dimensions as the panorama but can be indexed proportionally.

As discussed above, the combined panoramic display and video display process is a display process in which a scene is decomposed into static and dynamic components. The panoramic image 201 is the static component, while the streaming video 601 is the dynamic component. When access to such a scene is provided over a network from a server to a client, preferably the server first communicates the panoramic image 201 to the client. The client may then browse the local copy of the panoramic image 201. Next, the streaming video 601 is communicated from the server to the client and integrated with the panoramic image to form a combined display. Subsequent transmission of scene data continues as an interleaving mix of static panoramic image data and dynamic streaming video data.

While the invention has been particularly shown and described with respect to preferred embodiments thereof, it will be understood by those skilled in the art that changes in form and details may be made therein without departing from the scope and spirit of the invention.

What is claimed is:

1. A method for displaying an image of a scene of interest from a stored environment map of the scene and from video data of the scene, the method comprising the steps of:
   receiving and storing the video data of the scene;
   selecting an orientation of the scene;
   retrieving video data according to the selected orientation of the scene;
   rendering the environment map according to the selected orientation of the scene to generate a first image for the selected orientation;
   synchronously combining the retrieved video data and the first image to form a composite image for the selected orientation of the scene of interest; and
   displaying the composite image.

2. A method for displaying an image of a scene of interest as set forth in claim 1, wherein the step of receiving the video data further comprises a step of continuously receiving video data packets that include image data and sound data.

3. A method for displaying an image of a scene of interest as set forth in claim 1, wherein the received video data is stored in a video memory buffer and the step of synchronously combining further comprises the steps of:
   retrieving the received video data from the video memory buffer; and
   embedding the retrieved video data within the first image to form the composite image.

4. A method for displaying an image of a scene of interest as set forth in claim 3, further comprising a step of transforming the video data to a desired position and size by at least one of scaling, shearing, and stretching the video data.

5. A method for displaying an image of a scene of interest as set forth in claim 3, wherein the step of retrieving further comprises a step of evaluating a value of a pointer to a memory location and retrieving the contents of the memory location.

6. A method for displaying an image of a scene of interest as set forth in claim 3, wherein the step of embedding further comprises a step of layering the retrieved video data and the first image to form the composite image.

7. A method for displaying an image of a scene of interest as set forth in claim 6, wherein the step of layering is one of a step of drawing order layering, z-buffer-hiding layering, and chroma-key layering of one of the retrieved video data onto the first image and the first image onto the video data.

8. An image processing system for displaying an image of a scene of interest from a stored environment map of said scene and from video data of said scene comprising:

means for receiving and storing said video data of said scene;

means for selecting an orientation of said scene;

means for retrieving video data according to said selected orientation of said scene;

means for rendering said environment map according to said selected orientation of said scene to generate a first image for said selected orientation;

means for synchronously combining said retrieved video data and said first image to form a composite image for said selected orientation of said scene of interest; and means for displaying said composite image.

9. An image processing system for displaying an image of a scene of interest as set forth in claim 8, wherein said means for receiving said video data further comprises means for continuously receiving video data packets that include image data and sound data.

10. An image processing system for displaying an image of a scene of interest as set forth in claim 8, wherein said means for receiving said video data further comprises a video memory buffer.

11. An image processing system for displaying an image of a scene of interest as set forth in claim 8, wherein said means for synchronously combining said retrieved video data and said first image further comprises:

means for retrieving said received video data from said video memory buffer; and means for embedding said retrieved video data within said first image to form said composite image.

12. An image processing system for displaying an image of a scene of interest as set forth in claim 11, further comprising means for transforming said video data retrieved from said video memory buffer to a desired position and size by at least one of scaling, shearing, and stretching the video data prior to embedding said video data within said first image.

13. An image processing system for displaying an image of a scene of interest as set forth in claim 11, wherein said means for retrieving said video data from said video memory buffer further comprises means for evaluating a value of a pointer to a memory location and for retrieving said contents of said memory location.

14. An image processing system for displaying an image of a scene of interest as set forth in claim 11, wherein said means for embedding further comprises means for layering said retrieved video data and said first image to form said composite image.

15. An image processing system for displaying an image of a scene of interest as set forth in claim 14, wherein said means for layering further comprises means for chroma-key layering of one of said retrieved video data onto said first image and said first image onto said video data.

16. A method for displaying an image of a scene of interest from a stored environment map of the scene and from image data of the scene, the method comprising the steps of:

continuously receiving and storing video data packets that include the image data and sound data of the scene;

selecting an orientation of the scene;

retrieving image data according to the selected orientation of the scene;

rendering the environment map according to the selected orientation of the scene to generate a first image for the selected orientation;

synchronously combining the retrieved image data and the first image to form a composite image for the selected orientation of the scene of interest;

continuously playing sound data of the scene; and displaying the composite image.

17. A method for displaying an image of a scene of interest as set forth in claim 16, wherein the step of continuously playing sound data further comprises a step of controlling the volume of the sound data being played.

18. A method for displaying an image of a scene of interest from a stored environment map of the scene and from video data of the scene, the method comprising the steps of:

receiving the video data of the scene and storing the video data in a video buffer;

selecting an orientation of the scene;

retrieving video data from the video buffer according to the selected orientation of the scene, wherein the video data remains separate from the environment map;

rendering the environment map according to the selected orientation of the scene to generate a first image for the selected orientation;

synchronously combining the retrieved video data and the first image to form a composite image for the selected orientation of the scene of interest; and displaying the composite image.

* * * * *